(12) United States Patent
Ryu

(10) Patent No.: US 9,420,502 B2
(45) Date of Patent: *Aug. 16, 2016

(54) METHOD AND APPARATUS FOR TRANSMITTING MEASUREMENT REPORT MESSAGE IN WIRELESS COMMUNICATION SYSTEM

(71) Applicant: LG Electronics Inc., Seoul (KR)

(72) Inventor: Jin Sook Ryu, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/731,733

(22) Filed: Jun. 5, 2015

(65) Prior Publication Data

US 2015/0271715 A1    Sep. 24, 2015

Related U.S. Application Data

(63) Continuation of application No. 13/818,063, filed as application No. PCT/KR2011/005997 on Aug. 16, 2011, now Pat. No. 9,078,181.

(60) Provisional application No. 61/377,070, filed on Aug. 25, 2010.

(30) Foreign Application Priority Data

Jul. 11, 2011    (KR) .................. 10-2011-0068358

(51) Int. Cl.
*H04W 36/00* (2009.01)
*H04W 24/10* (2009.01)
*H04W 24/08* (2009.01)
*H04W 84/04* (2009.01)

(52) U.S. Cl.
CPC .......... *H04W 36/0061* (2013.01); *H04W 24/08* (2013.01); *H04W 24/10* (2013.01); *H04W 36/0088* (2013.01); *H04W 84/042* (2013.01); *H04W 84/045* (2013.01)

(58) Field of Classification Search
None
See application file for complete search history.

(56) References Cited

U.S. PATENT DOCUMENTS

| 6,647,262 | B1 | 11/2003 | Demetrescu et al. |
| 2010/0113009 | A1 | 5/2010 | Jeong et al. |
| 2010/0124179 | A1 | 5/2010 | Lee et al. |
| 2010/0240358 | A1* | 9/2010 | Jen et al. ............ 455/424 |

FOREIGN PATENT DOCUMENTS

| JP | 2010-0034885 | 4/2010 |
| JP | 2010-0050339 | 5/2010 |
| JP | 2010-0109664 | 5/2010 |

* cited by examiner

*Primary Examiner* — Ayaz Sheikh
*Assistant Examiner* — Tarell Hampton
(74) *Attorney, Agent, or Firm* — Dentons US LLP

(57) ABSTRACT

A method and apparatus of transmitting a measurement report message in a wireless communication system is provided. A mobile station searches for at least one closed subcarrier group (CSG) cell included in a whitelist of the mobile station, and transmits to a GSM/EDGE radio access network (GERAN) cell the measurement report message including a toggling discriminator, which indicates an optimal CSG cell that satisfies a reporting criterion among the at least one found CSG cell, and a physical cell identify (PCI) and frequency of the optimal CSG cell.

18 Claims, 3 Drawing Sheets

METHOD AND APPARATUS FOR TRANSMITTING MEASUREMENT REPORT MESSAGE IN WIRELESS COMMUNICATION SYSTEM

This application is a Continuation application of U.S. patent application Ser. No. 13/818,063, filed Feb. 20, 2013, now allowed, which is a national stage entry of International Application Number PCT/KR2011/005997, filed Aug. 16, 2011, and claims priority to Korean Patent Application Number 10-2011-0068358, filed Jul. 11, 2011 and U.S. Provisional Application Ser. No. 61/377,070 filed Aug. 28, 2010, and each of the above-identified applications are incorporated by reference herein in their entirety.

TECHNICAL FIELD

The present invention relates to wireless communications, and more particularly, to a method and apparatus for transmitting a measurement report message in a wireless communication system.

BACKGROUND ART

A global system for mobile communication (GSM) is a radio technology which has been developed as a system for standardizing radio communication systems in. A general packet radio service (GPRS) is a technique introduced to provide a packet switched data service in a circuit switched data service provided from the GSM. A universal mobile telecommunication system (UMTS) is a wireless communication system based on wideband code division multiple access (WCDMA). E-UTRAN is a wireless communication system based on orthogonal frequency division multiple access (OFDMA).

To overcome a restriction of a service area and a limitation of a user capacity, the wireless communication system provides a communication service by dividing the service area into a plurality of cells. This is referred to as a multi-cell environment.

Cell selection is a process in which a mobile station (MS) selects a cell to receive a service. The purpose of the cell selection is to register the MS to a network in order to receive the service from a base station (BS). In general, the MS selects a cell having a strongest signal property value by performing a signal measurement process with respect to the BS in all searchable frequency bands. The cell selected by the MS is referred to as a serving cell. A cell neighboring to the serving cell is referred to as a neighbor cell.

When the MS moves from one place to another, it may be inappropriate to receive the service from the serving cell. In this case, the MS reselects a suitable cell capable of maintaining service quality and receiving a signal with better quality. This is referred to as cell reselection. The cell reselection is a process of selecting a more suitable cell based on criteria for cell reselection and signal measurement in an idle state. In the idle state, the MS repeats a process of reselecting a cell having a better signal property by measuring signals in the serving cell and the neighbor cell. For the MS with mobility, the cell reselection is important in order to receive a service with better quality.

The MS may belong to one or more closed subscriber groups (CSGs). If the MS belongs to the CSG, at least one CSG identity (ID) may be included in a CSG whitelist of the MS. The CSG whitelist is provided by a non-access-stratum (NAS), and is a list including CSG IDs of all CSGs to which a subscriber belongs. If the MS belongs to at least one CSG, the MS additionally uses an autonomous search function for UTRAN and/or E-UTRAN CSG cells in general cell reselection. The section 6.6.7 of 3GPP TS 45.008 V9.1.0 (2009-11) "3rd generation Partnership Project; Technical Specification Group GSM/EDGE Radio Access Network; Radio subsystem link control (Release 9)" can be incorporated herein by reference for description of the cell reselection to the CSG cell. If the strongest cell detected by the MS from the UTRAN or E-UTRAN cells is a proper CSG cell, the MS reselects the CSG cell irrespective of a cell reselection rule for a cell currently accessed. If the MS does not have the CSG whitelist or if the CSG whitelist is empty, the MS does not use the autonomous search function for the CSG cell. The network provides the MS with information regarding a dedicated UTRAN CSG frequency and/or a dedicated E-UTRAN CSG frequency. If the MS does not have the CSG whitelist or if the CSG whitelist is empty, the MS ignores a corresponding frequency for measurement and cell reselection.

The network can request the MS to send a measurement report and can control cell reselection of the MS. This can be referred to as network controlled cell reselection. The section of 3GPP TS 45.008 V9.1.0 (2009-11) "3rd generation Partnership Project; Technical Specification Group GSM/EDGE Radio Access Network; Radio subsystem link control (Release 9)" can be incorporated herein by reference for the description of the network controlled cell reselection. The network controlled cell reselection can be performed depending on a mode such as NC0, NC1, NC2, etc. In the NC0 mode, the MS performs autonomous cell reselection. In the NC1 mode, the MS reports a measurement result to the network and performs autonomous cell reselection. In the NC2 mode, the MS reports the measurement result to the network, and performs the autonomous cell reselection only when cell reselection is triggered for a case of downlink signaling failure, random access failure, cell access prohibition, etc. The network controlled cell reselection can be performed by using a packet cell change order (PCCO) message. A set of measurement report parameters can be transmitted to the MS by using the PCCO message.

For mobility of the MS, the network controlled cell reselection can be supported with respect to CSG cells. Various methods can be proposed to support the network controlled cell reselection for the CSG cells. In particular, there is a need for an effective method for overcoming inefficiency and complexity of the conventional method.

SUMMARY OF INVENTION

Technical Problem

The present invention provides a method and apparatus for transmitting a measurement report message in a wireless communication system. In particular, the present invention provides a method and apparatus for effectively transmitting a measurement report message to support network controlled cell reselection for a closed subscriber group (CSG) cell in a wireless communication system.

Solution to Problem

In an aspect, a method of transmitting a measurement report message by a mobile station in a wireless communication system is provided. The method includes searching for at least one closed subcarrier group (CSG) cell included in a whitelist of the mobile station, and transmitting to a GSM/EDGE radio access network (GERAN) cell the measurement report message including a toggling discriminator, which indicates an optimal CSG cell that satisfies a reporting criterion among the at least one found CSG cell, and a physical cell identify (PCI) and frequency of the optimal CSG cell.

The toggling discriminator may consist of one bit.

If the optimal CSG cell is a CSG cell which has the same PCI as the previously reported optimal CSG cell and which is different from the previously reported optimal CSG cell, the toggling discriminator may be toggled.

A value of the toggling discriminator may be changed from 0 to 1 or from 1 to 0 by the toggling of the toggling discriminator.

If there is no CSG cell having the same PCI as the optimal CSG cell, the toggling discriminator may be assigned to 0.

The reporting criterion may include whether the optimal CSG cell has the best channel quality in a frequency domain among the at least one found CSG cell.

The measurement report message may be transmitted by being included in any one of a packet measurement report message, a packet enhanced measurement report message, and a packet cell change notification message.

The measurement report message may not include routing parameters.

In another aspect, a method of transmitting a measurement report message by a mobile station in a wireless communication system is provided. The method includes transmitting to a GERAN cell a first measurement report message including a physical cell identify (PCI), frequency, and first toggling discriminator, which has a value of 0 or 1, of a first CSG cell, and transmitting to the GERAN cell a second measurement report message including a PCI, frequency, and second toggling discriminator, which has a value of 0 or 1, of a second CSG cell, wherein the PCI of the first CSG cell and the PCI of the second CSG cell are equal to each other, wherein the second toggling discriminator has a value of 1 when the first toggling discriminator has a value of 0, and wherein the second toggling discriminator has a value of 0 when the first toggling discriminator has a value of 1.

The first toggling discriminator and the second toggling discriminator may consist of one bit.

The first measurement report message and the first measurement report message may be transmitted by being included in any one of a packet measurement report message, a packet enhanced measurement report message, and a packet cell change notification message.

In another aspect, a mobile station in a wireless communication system is provided. The mobile station includes a radio frequency (RF) unit transmitting and receiving a radio signal, and a processor, coupled to the RF unit, and configured for searching for at least one CSG cell included in a whitelist of the mobile station, and transmitting to a GERAN cell the measurement report message including a toggling discriminator, which indicates an optimal CSG cell that satisfies a reporting criterion among the at least one found CSG cell, and a PCI and frequency of the optimal CSG cell.

Advantageous Effects of Invention

According to the present invention, network controlled cell reselection for a closed subscriber group (CSG) cell can be effectively supported.

MODE FOR THE INVENTION

Figure 1:
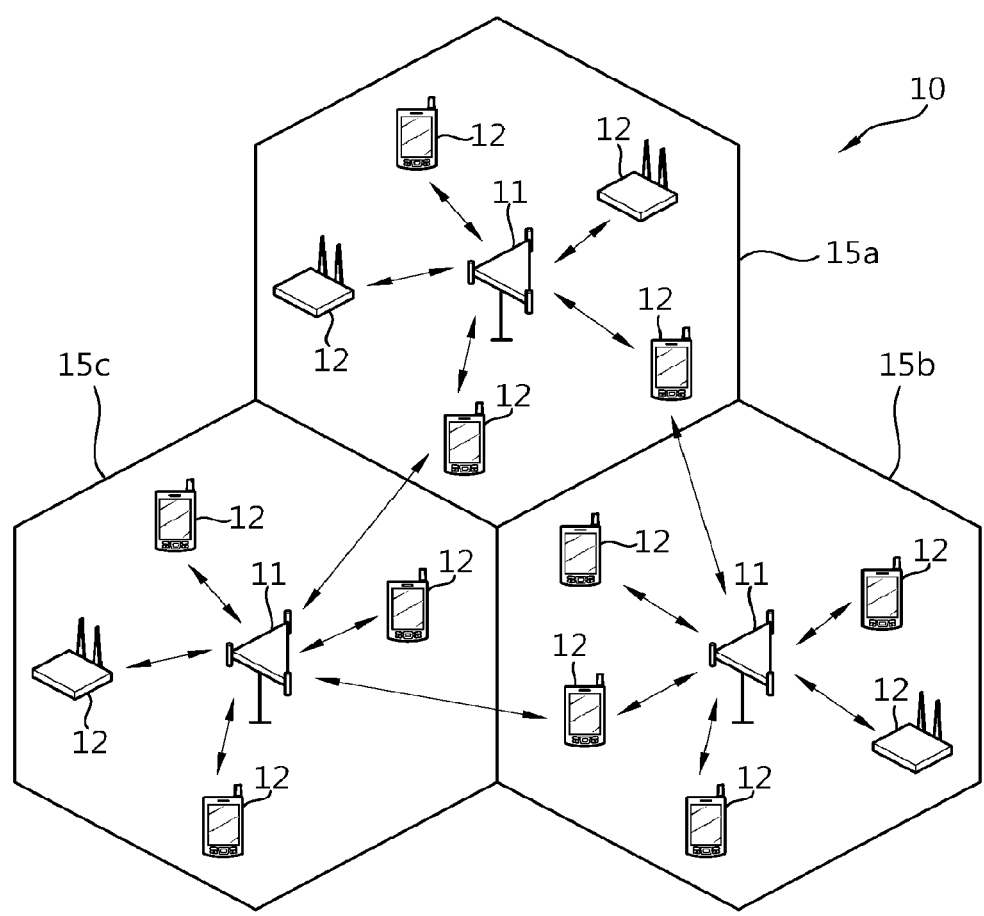
FIG. 1 illustrates a wireless communication system.

FIG. 1 illustrates a wireless communication system.

The wireless communication system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as MS (Mobile Station), MT (Mobile Terminal), UT (User Terminal), SS (Subscriber Station), wireless device, PDA (Personal Digital Assistant), wireless modem, handheld device. The BS 11 generally refers to a fixed station that communicates with the UE 12 and may be called by other names such as eNB (evolved-NodeB), BTS (Base Transceiver System), access point (AP), etc.

In general, a UE belongs to one cell, and the cell to which a UE belongs is called a serving cell. A BS providing a communication service to the serving cell is called a serving BS. The wireless communication system is a cellular system, so a different cell adjacent to the serving cell exists. The different cell adjacent to the serving cell is called a neighbor cell. A BS providing a communication service to the neighbor cell is called a neighbor BS. The serving cell and the neighbor cell are relatively determined based on a UE.

This technique can be used for downlink or uplink. In general, downlink refers to communication from the BS 11 to the UE 12, and uplink refers to communication from the UE 12 to the BS 11. In downlink, a transmitter may be part of the BS 11 and a receiver may be part of the UE 12. In uplink, a transmitter may be part of the UE 12 and a receiver may be part of the BS 11.

There is a need to allow a packet cell change order (PCCO) for a closed subscriber group (CSG) cell in an NC2 mode of network controlled cell reselection.

Routing parameters of the CSG cell for reporting of a measurement result occupy a larger space than that of parameters of a general macro cell. Accordingly, the number of macro cells included in a measurement report message is decreased, and a mobile station (MS) inevitably experiences deterioration in its mobility property. The routing parameter may be a cell global identifier (ID) (or simply referred to as a CGI), a public land mobile network (PLMN) ID, a CSG ID, etc. The routing parameter is an essential element for constituting a target CSG cell from the perspective of a serving GPRS supporting node (SGSN) or a mobile switching center (MSC). In case of a packet-switched (PS) handover to the CSG cell, the routing parameters need to be reported to the target CSG cell in order to support the mobility property to the CSG cell. However, reporting of the routing parameter is not explicitly required as to another mobility property other than the handover.

The network controlled cell reselection is performed by a GSM/EDGE radio access network (GERAN) cell unlike the PS handover. The GERAN cell gathers measurement results of known CSG cells. Each CSG cell needs to be uniquely identified in the coverage of the GERAN cell, but does not need to be uniquely identified in an overall network. In addition, since the MS has its own CSG whitelist and can determine possibility of access permission according to the CSG whitelist, the access permission by the GERAN cell is not required to allow the MS to access each CSG cell. Therefore, there is no need to report the CSG ID of each CSG cell to the GERAN cell.

Accordingly, for another mobility property other than the PS handover, a method of indexing CSG cells was proposed instead of reporting the routing parameter in order to solve a physical cell identify (PCI)/primary scrambling code (PSC) confusion problem. The method of indexing the CSG cells proposes a method in which different CSG cells that share the same physical layer parameter in the coverage of the GERAN cell are discriminated by an n-bit discriminator. In this case, the physical layer parameter may include a PCI, a frequency, etc., and the different CSG cells have different CGIs. It is assumed hereinafter that the physical layer parameter is represented by the PCI. Since the different CSG cells are indexed by the discriminator, the PCI/PSC confusion problem can be reduced among a plurality of CSG cells having the same PCI.

However, the conventional method of indexing the CSG cells by using the n-bit discriminator has several shortcomings. First, the MS needs to remember connection relations between the n-bit discriminator and all CSG cells detected in the GERAN cell. That is, the MS has to know all discriminators allocated to the respective CSG cells. For example, the MS may first be connected to a CSG cell A having a discriminator value of 0, and then may reselect a CSG cell B having a discriminator value 1. Thereafter, in order for the MS to reselect the CSG cell A, the MS has to know that the discriminator value of the CSG cell A is 0. Second, there is a problem in that, although the conventional method can reduce the PCI/PSC confusion problem, the PCI/PSC confusion problem may still occur according to the number of CSG cells having the same PCI in the GERAN cell. For example, when the number of CSG cells having the same PCI is 5 and the CSG cells are discriminated by a 2-bit discriminator, a discriminator value which has already been assigned is inevitably assigned to one CSG cell. In a state where a discriminator 0 is assigned a CSG cell A, a discriminator 1 is assigned to a CSG cell B, a discriminator 2 is assigned to a CSG cell C, a discriminator 3 is assigned to a CSG cell D, and the discriminator 0 is assigned again to a CSG cell E, if the MS reselects the CSG cell A, which discriminator will be assigned to the CSG cell A becomes ambiguous. Therefore, the conventional method cannot completely avoid the PCI/PSC confusion problem.

In addition, although the PCI/PSC confusion problem may be a big problem when performing a handover for the CSG cell, it may not be much problematic in a network controlled cell reselection procedure. This is because the network determines only whether the MS can move to the target CSG cell on the basis of a received measurement result in the network controlled cell reselection procedure, and load balancing of the CSG cells is not easily managed due to insufficient information and operation/management overhead. That is, even if the MS reports the n-bit discriminator or the CSI of each CSG cell, there is a high possibility that the network does not use the reported n-bit discriminator or CSI of each CSG cell.

Hereinafter, the proposed method of transmitting a measurement report message will be described according to an embodiment of the present invention.

When a network supports network controlled cell reselection for a CSG cell and an MS supports a UTRA/E-UTRA CSG cell report, the MS reports a measurement result of the CSG cell to a GERAN cell together with a PCI when a specific reporting criterion is satisfied. The reporting criterion may be whether a CSG ID is included in a CSG whitelist of the MS, whether the CSG cell is a cell having the greatest signal strength among a plurality of CSG cells, and whether the CSG cell satisfies a cell reselection criterion defined in the section of 3GPP TS 45.008 V9.1.0 (2009-11) "3rd generation Partnership Project; Technical Specification Group GSM/ EDGE Radio Access Network; Radio subsystem link control (Release 9)".

In this case, the MS can report a measurement result by selecting one of two different CSG cells having the same PCI. The reported measurement result of the CSG cell can be reported together with the PCI of the CSG cell. The measurement result can be transmitted by being included in a packet measurement report message, a packet enhanced measurement report message, a packet cell change notification message, etc. In this case, a 1-bit discriminator can be additionally used in order to indicate a specific CSG cell of which a measurement result is reported. Whenever the measurement results of the different CSG cells having the same PCI are reported, the 1-bit discriminator is toggled and included in a measurement result report. That is, if there is no different CSG cell having the same PCI as a result of searching for a CSG cell by the MS, a discriminator value corresponding to the found CSG cell is always assigned to 0. However, if the MS searches for one or more CSG cells having the same PCI, and the measurement report of the CSG cell having the corresponding PCI has been previously reported, the discriminator is toggled whenever the measurement result of the CSG cell having the corresponding PCI is reported. The toggling of the discriminator can be expressed such that that the discriminator value is increased by 1 mod 2. The measurement report message does not include routing parameters. When considering an average value of the measurement report message received normally by the network, there is a need to indicate how long the reported CSG cell is valid. In this case, the discriminator reports whether a CSG cell of which a measurement result is currently reported is the same CSG cell as the CSG cell of which the measurement result is reported right before, which may play a very important role when the network uses the measurement result to determine whether the MS will perform cell reselection.

Figure 2:
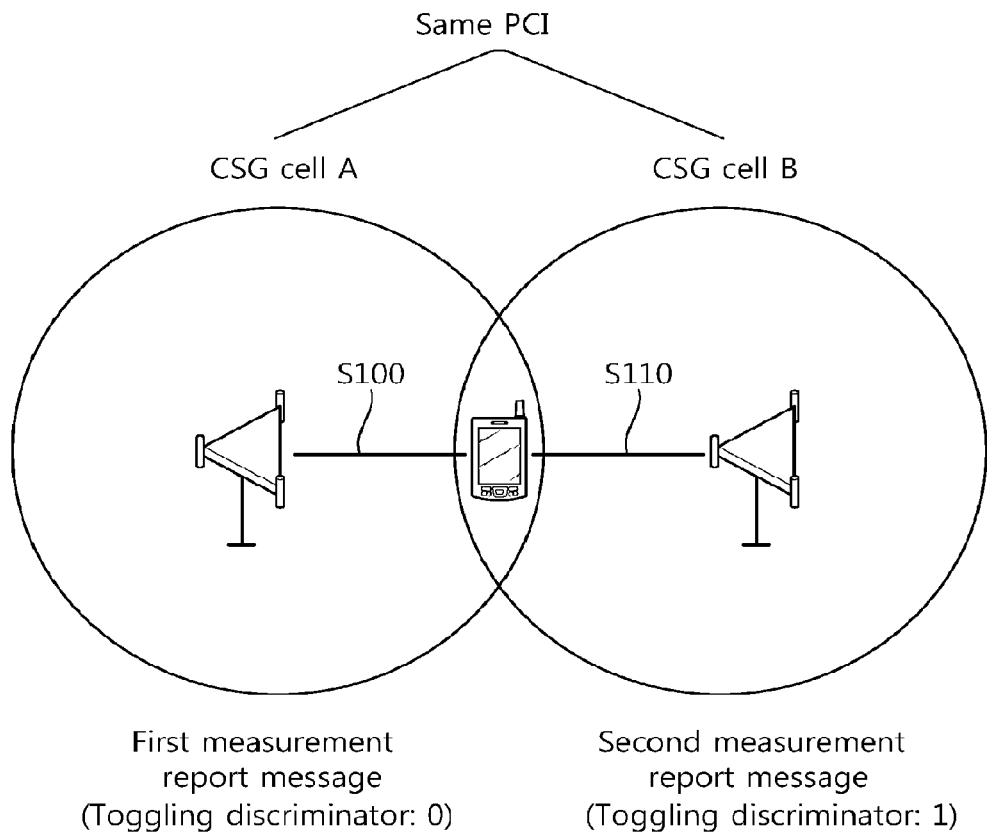
FIG. 2 shows an example of a case of applying the proposed method of transmitting a measurement report message.

FIG. 2 shows an example of a case of applying the proposed method of transmitting a measurement report message.

Referring to FIG. 2, it is assumed that a CSG cell A and a CSG cell B share the same PCI. In step S100, the CSG cell A reaches a CSG cell reporting criterion in a first measurement reporting period, and thus an MS reports a measurement result of the CSG cell A together with physical cell information such as a frequency, a PCI, etc.

However, the CSG cell B has a better cell condition than the CSG cell A in a second measurement reporting period. Therefore, in step S110, the MS reports a measurement result of the CSG cell B together with the same physical cell information as that reported to the CSG cell A. In order to discriminate the CSG cell A and the CSG cell B, a 1-bit discriminator can be added to a measurement report message reported to a GERAN cell. The 1-bit discriminator can be toggled whenever the reported CSG cell is changed. For example, the 1-bit discriminator may have a value of 0 when the MS reports the measurement result of the CSG cell A in the first measurement reporting period. When the MS reports the measurement result of the CSG cell B in the second measurement reporting period, the reported CSG cell is changed and thus the 1-bit discriminator value is togged to 1. Thereafter, when the MS reports a measurement result of a different CSG cell having the same PCI other than the CSG cell B, the 1-bit discriminator value is toggled back to 0. The 1-bit discriminator is managed in a unit of CSG cells having the same PCI, and upon detection of a CSG cell having a different PCI, the 1-bit discriminator is newly assigned to 0. When the different CSG cell having the same PCI is found and reported, the 1-bit discriminator is toggled again. According to the proposed method of transmitting the measurement report message, cell reselection can also be performed to a CSG cell of the MS even if a BS does not know PCI/PSC split information.

Meanwhile, the network can return the discriminator included in the measurement report message to the MS when transmitting a PCCO message to the MS.

Figure 3:
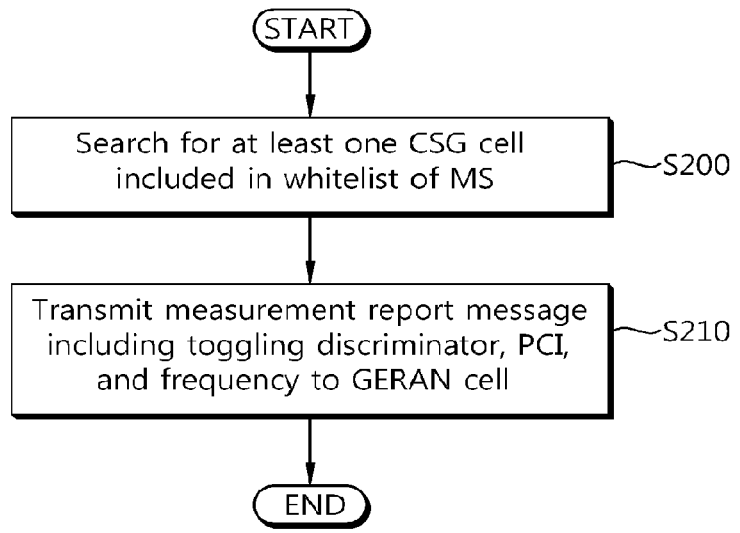
FIG. 3 shows the proposed method of transmitting a measurement report message according to an embodiment of the present invention.

FIG. 3 shows the proposed method of transmitting a measurement report message according to an embodiment of the present invention.

In step S200, an MS searches for at least one CSG cell included in a whitelist of the MS. In step S210, the MS transmits to a GERAN cell a toggling discriminator for indicating an optimal CSG cell that satisfies a reporting criterion among the at least one found CSG cell, and a PCI and frequency of the optimal CSG cell. In this case, the toggling discriminator can be toggled when the optimal CSG cell is a different CSG cell having the same PCI as the previously reported optimal CSG cell. Alternatively, the toggling discriminator can be assigned to 0 when there is no CSG cell having the same PCI as the optimal CSG cell. The toggling discriminator may consist of one bit.

Figure 4:
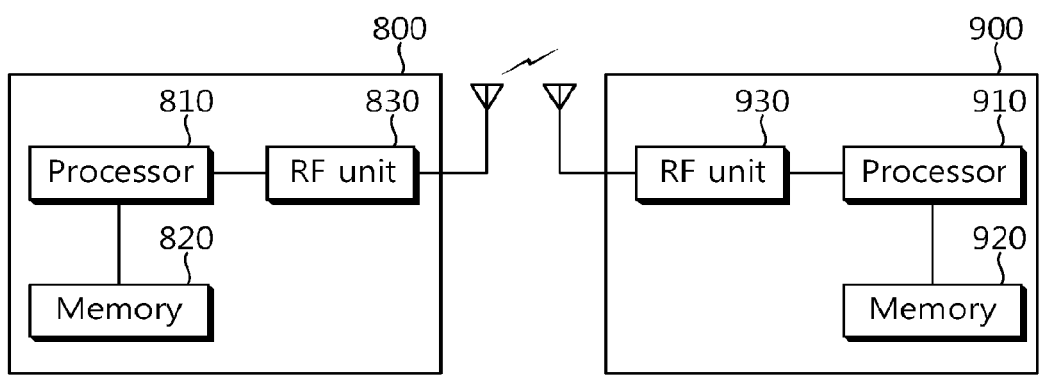
FIG. 4 is a block diagram showing a wireless communication system for implementing an embodiment of the present invention.

FIG. 4 is a block diagram showing a wireless communication system for implementing an embodiment of the present invention.

A BS 800 includes a processor 810, a memory 820, and a radio frequency (RF) unit 830. The processor 810 implements the proposed functions, procedures, and/or methods. Layers of a radio interface protocol can be implemented by the processor 810. The memory 820 is coupled to the processor 810, and stores a variety of information for driving the processor 810. The RF unit 830 is coupled to the processor 810, and transmits and/or receives a radio signal.

An MS 900 includes a processor 910, a memory 920, and an RF unit 930. The processor 910 implements the proposed functions, procedures, and/or methods. Layers of a radio interface protocol can be implemented by the processor 910. The memory 920 is coupled to the processor 910, and stores a variety of information for driving the processor 910. The RF unit 930 is coupled to the processor 910, and transmits and/or receives a radio signal.

The processor 910 may include an application-specific integrated circuit (ASIC), another chip set, a logical circuit, and/or a data processing unit. The RF unit 920 may include a baseband circuit for processing radio signals. In software implemented, the aforementioned methods can be implemented with a module (i.e., process, function, etc.) for performing the aforementioned functions. The module may be performed by the processor 910.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed:

1. A method for reporting, by a mobile station (MS), a closed subscriber group (CSG) cell in a wireless communication system, the method comprising:
    reporting, by the MS, a first CSG cell with an indicator which has a first value;
    reporting, by the MS, a second CSG cell with the indicator which has a second value,
    wherein the second CSG cell is a different CSG cell from the first CSG cell and has the same physical cell identity as the first CSG cell, and
    wherein the second value is a toggled value of the first value.

2. The method of claim 1, wherein the indicator consists of one bit.

3. The method of claim 1, wherein the first value is 0, and wherein the second value is 1.

4. The method of claim 1, wherein the first value is 1, and wherein the second value is 0.

5. The method of claim 1, wherein reporting the CSG cell comprises reporting at least one of a physical cell identity of the CSG cell, a frequency of the CSG cell, or a measurement quantity of the CSG cell.

6. The method of claim 1, wherein the first CSG cell and the second CSG cell meet reporting criteria.

7. The method of claim 6, wherein the reporting criteria include whether the first CSG cell and the second CSG cell are included in a whitelist of the MS.

8. The method of claim 6, wherein the reporting criteria include whether the first CSG cell and the second CSG cell have best channel quality in frequency domain among at least one CSG cell.

9. The method of claim 1, wherein the indicator is reported via a packet cell change notification message.

10. A mobile station (MS) comprising:
    a memory;
    a radio frequency (RF) unit; and
    a processor coupled to the memory and the RF unit, and configured to:
    control the RF unit to report a first closed subscriber group (CSG) cell with an indicator which has a first value;
    control the RF unit to report a second CSG cell with the indicator which has a second value,
    wherein the second CSG cell is a different CSG cell from the first CSG cell and has the same physical cell identity as the first CSG cell, and
    wherein the second value is a toggled value of the first value.

11. The MS of claim 10, wherein the indicator consists of one bit.

12. The MS of claim 10, wherein the first value is 0, and wherein the second value is 1.

13. The MS of claim 10, wherein the first value is 1, and wherein the second value is 0.

14. The MS of claim 10, wherein reporting the CSG cell comprises reporting at least one of a physical cell identity of the CSG cell, a frequency of the CSG cell, or a measurement quantity of the CSG cell.

15. The MS of claim 10, wherein the first CSG cell and the second CSG cell meet reporting criteria.

16. The method of claim 15, wherein the reporting criteria include whether the first CSG cell and the second CSG cell are included in a whitelist of the MS.

17. The MS of claim 15, wherein the reporting criteria include whether the first CSG cell and the second CSG cell have best channel quality in frequency domain among at least one CSG cell.

18. The MS of claim 10, wherein the indicator is reported via a packet cell change notification message.

* * * * *